Patented Apr. 26, 1932

1,855,295

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

NITROGENOUS VAT DYESTUFFS

No Drawing. Application filed October 11, 1928, Serial No. 311,959, and in Germany October 18, 1927.

We have found that particularly valuable new vat dyestuffs are obtained by condensing aromatic compounds which expression is meant to comprise in the description and in the appended claims isocyclic as well as polynuclear heterocyclic compounds containing a plurality of negative substituents of identical or different character, such as halogen or nitro groups, simultaneously or successively with a plurality of nitrogenous compounds containing at least one reactive hydrogen atom on the nitrogen atom of which at least two must be different from each other, at least one of the components taking part in the reaction being capable of being vatted. The condensation is preferably effected with the addition of acid fixing agents or condensing catalysts or both, in the presence or absence of solvents or diluents. By the said treatment the negative substituents are replaced by at least two different nitrogenous radicles. As solvents or diluents which may be used in the process those of a high boiling point are particularly suitable for instance nitrobenzene, nitrotoluene, naphthalene, nitronaphthalene and the like. Copper, aluminium or mercury or their compounds may for example be employed as condensing catalysts. According to the aforesaid manner of working, probably mixed imides or acylamines are formed which, in most cases, possess better properties as regards tinctorial value and fastness than the products which are substituted several times by the same nitrogenous radicle, or even than the mechanical mixtures of the corresponding individual bodies. Moreover, by reason of the change of shade accompanying the introduction of different nitrogenous radicles, it is possible to obtain the desired shade of color by a suitable selection of the reacting components.

It appears to be a rule that by condensing aromatic compounds of high molecular weight condensation products are obtained dyeing deep, for instance violet blue, grey or blue black shades, whereas the condensation of aromatic compounds of lower molecular weight lead to vat dyestuffs dyeing brighter, for instance yellow, red blue red or blue shades. Such products dyeing brighter shales are further preferably obtained by employing acid amides as nitrogenous components. The expression "compounds of low molecular weight" is meant to comprise those of a molecular weight up to about 250.

The capacity of the condensation products to form vats is particularly marked in the case of such condensation products as contain several radicles capable of being vatted. Therefore it is suitable especially in the case of condensation products of high molecular weight to employ several components capable of being vatted. In the production of the new vat dyestuffs according to the present invention it is irrelevant which of the reaction components contain the negative substituents and which the nitrogen atoms to which the reactive hydrogen atom is attached. Thus for instance, the same vat dyestuff is obtained whether 1 molecular weight of 1.5 dichloranthraquinone is condensed with 1 molecular weight of 1-aminoanthraquinone and 1 molecular weight of monoaminodibenzanthrone, or if 1 molecular weight of 1.5-diaminoanthraquinone is condensed with 1 molecular weight of 1-chloranthraquinone and 1 molecular weight of monobromdibenzanthrone. Likewise the same vat dyestuff is obtained by condensation of 1 molecular weight of dichlor-allo-ms-naphthodianthrone with 1 molecular weight of benzamide and 1 molecular weight of anthraquinone-2-carboxylic acid amide, or by condensation of 1 molecular weight of diamino-allo-ms-naphthodianthrone with 1 molecular weight of benzoyl chlorid and 1 molecular weight of anthraquinone-2-carboxylic acid chlorid.

As radicles which may be combined in the aforedescribed manner the radicles of the following aromatic compounds which expression comprises their homologues and derivatives may be mentioned: benzene, naphthalene, anthracene, phenanthrene, perylene, pyrene, indigo, thioindigo, anthrachinonazines, flavanthrene, anthrachinonacridones, the different dianthrones which are connected with each other by one or more ring system dibenzanthrone, isodibenzanthrone, dibenzpyrenquinones, anthanthrone, carbazols, quinolines, pyrazolanthrones, naphthazines and the like.

According to the present invention it is not necessary to bring the components into mutual reaction in exact stoichiometric relative proportions. For example, 1 molecular proportion of an aromatic compound containing 4 atoms of bromine, may be brought into reaction with 2½ molecular proportions of monoaminodibenzanthrone, and 1½ molecular proportions of alpha-aminoanthraquinone, or, as an alternative, with 3 molecular proportions of monoaminodibenzanthrone, and 1 molecular proportion of alpha-aminoanthraquinone. If for example tetrabrompyranthrone, which, when condensed with 4 molecular proportions of alpha-aminoanthraquinone, furnishes a reaction product which dyes a violet black shade and, when condensed with 4 molecular proportions of aminodibenzanthrone, furnishes black dyeings with a greenish tinge, be condensed in the manner above described with a mixture containing 4 molecular proportions, jointly of these two amines, dyestuffs are obtained which, according to the relative proportions of the components employed dye black shades with a more or less violet or greenish tinge, or neutral black shades.

The resulting dyestuffs, of which, for the most part, theoretical yields are obtained, are, generally speaking, sparingly soluble in the usual organic solvents. Those of the condensation products as aforesaid are probably mixed imides can further be subjected to carbazolization by a treatment with acid or alkaline condensing agents.

The following examples will further illustrate the nature of the said invention which however is not limited thereto. The parts are by weight.

*Example 1*

72 parts of tetrabrompyranthrone, prepared, for example, by treating pyranthrone with bromine in chlorsulfonic acid, are stirred and boiled in 3000 parts of nitrobenzene with 50 parts of sodium acetate, 15 parts of copper oxide and 140 parts of aminodibenzanthrone, prepared for example according to U. S. Patent No. 796,393, until all the aminodibenzanthrone has undergone condensation which takes place in about 15 hours, whereupon 15 to 20 parts of 1-aminoanthraquinone are added and boiling is continued until the formation of the dyestuff ceases to increase, that is for about from 6 to 8 hours. The product is then filtered by suction, while hot, washed with hot nitrobenzene, extracted by boiling with dilute hydrochloric acid, washed until neutral and dried. The black powder, which is obtained in excellent yield, is practically free from halogen, gives a violet solution with concentrated sulfuric acid, and furnishes with alkaline hydrosulphite solution, a blue vat solution having a violet tinge, from which extremely fast grey to black dyeings are obtained on the vegetable fibre. The new dyestuff probably corresponding to the formula:

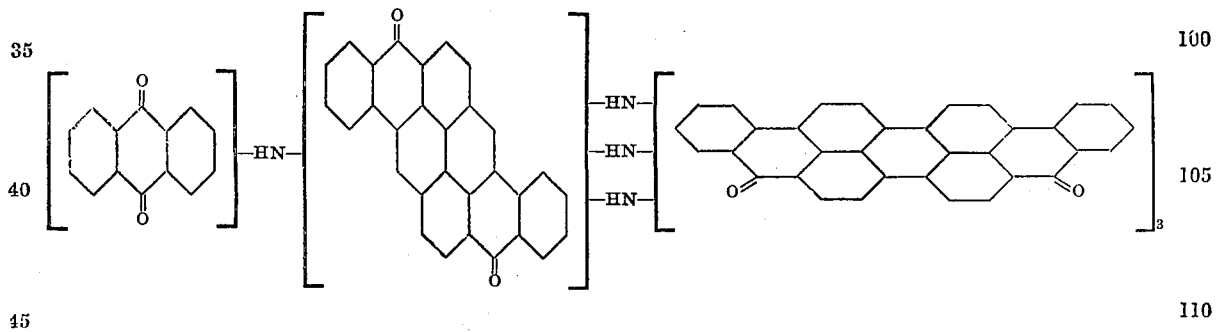

is almost insoluble in the usual organic solvents of high boiling point, and can be freed from the readily soluble impurities by boiling with nitrobenzene or other suitable solvents.

*Example 2*

A suspension of 36 parts of tetrabrompyranthrone, 59 parts of aminodibenzanthrone (prepared as in Example 1), 30 parts of sodium acetate and 7 parts of copper oxid in 600 parts of nitrobenzene, is boiled and stirred for about 15 hours. Thereupon 20 parts of 1-aminoanthraquinone are added, and boiling is continued until the formation of the dyestuff is complete. On treatment as described in Example 1, the new dyestuff probably corresponding to the formula:

ample 1. The dyestuff, which is obtained in an excellent yield, is a blue black powder and

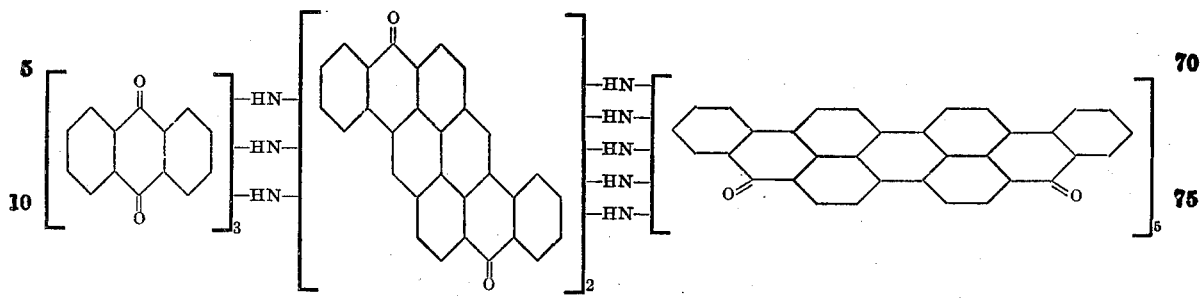

is obtained as a black powder, which dissolves to a violet solution in concentrated sulfuric acid, and gives very fast grey to black dyeings on cotton from a violet blue vat, the shades obtained being slightly more reddish in tinge than with the dyestuff obtained according to Example 1.

In exactly the same way, with a charge in which 3 molecular proportions of 1-aminoanthraquinone are employed, intsead of 1 molecular proportion of aminodibenzanthrone, per 1 molecular proportion of tetrabrompyranthrone, dyestuffs are obtained which give extremely fast dyeings, grey to black, on cotton.

Example 3

A suspension of 92 parts of dibromanthanthrone, prepared for example, by acting on anthanthrone with an excess of bromine in concentrated sulfuric acid, 140 parts of aminodibenzanthrone (prepared as in Example 1), 75 parts of sodium acetate and 5 parts of cupric oxid, in 3000 parts of nitrobenzene, are boiled and stirred for several hours, whereupon 75 parts of 1-aminoanthraquinone are added, and boiling is continued until the reaction product is free from halogen. It is then filtered by suction while hot, and is treated in the usual manner. The resulting dyestuff is very sparingly soluble in the usual organic solvents, and gives a violet solution with concentrated sulfuric acid. Extremely fast blue black dyeings are obtained on cotton from an alkaline hydrosulphite vat.

Example 4

47 parts of dichlor-allo-ms-naphthodianthrone, prepared, for example, by acting on the condensation product (allo-ms-naphthodianthrone) obtainable by treating 2.2'-dimethyl-ms-benzdianthrone with alkaline condensing agents with sulphuryl chlorid in nitrobenzene, are stirred and boiled in 500 parts of nitrobenzene, together with 70 parts of aminodibenzanthrone, prepared as in Example 1, 15 parts of 1-aminoanthraquinone, 50 parts of sodium acetate, 2 parts of copper carbonate and 2 parts of cupric oxid, until no trace of the initial material can be detected. The further treatment is the same as in Example 1. The dyestuff, which is obtained in an excellent yield, is a blue black powder and gives very fast black dyeings on the vegetable fibre from a blue vat with violet tinge. In concentrated sulfuric acid the dyestuff dissolves to a violet solution.

Example 5

66 parts of tetrabrom-ms-benzdianthrone, prepared, for example, by brominating ms-benzdianthrone, are suspended in 1000 parts of nitrobenzene, 140 parts of aminodibenzanthrone (prepared for example by reducing nitrodibenzanthrone obtained by nitrating dibenzanthrone in nitrobenzene) being added and the whole boiled and stirred for several hours, whereupon 30 parts of 1-aminoanthraquinone are added and boiling is continued until the formation of the dyestuff ceases to increase. The product is filtered by suction while hot, and is further treated in the usual manner. In this way the dyestuff is obtained in the form of a loose black powder, which dissolves to a violet solution in concentrated sulfuric acid and gives very fast grey to black dyeings on the vegetable fibre from a violet blue alkaline hydrosulphite vat.

In a similar manner, tribrom-ms-naphthodianthrone, prepared, for example, by treating tribrom-ms-benzdianthrone obtainable by brominating ms-benzdianthrone in nitrobenzene with an excess of bromine, with aluminium chlorid together with aminodibenzanthrone and 1-aminoanthraquinone furnishes, according to the relative proportions of the amine components employed, black to violet black dyestuffs, which give very fast similar dyeings on cotton from the vat.

Example 6

72 parts of tetrabrompyranthrone, prepared, for example, as indicated in Example 1, are boiled and stirred in 2000 parts of nitrobenzene, with 50 parts of 1.4-aminomethoxyanthraquinone 46 parts of 1-aminoanthraquinone, 80 parts of sodium acetate, 5 parts of cupric oxid and 2 parts of copper carbonate, until the formation of the dyestuff is complete. The product is filtered by suction while hot, washed with hot nitrobenzene and further treated as described in Example 1. The dyestuff, which is obtained in the form of a blue black powder, dissolves to a blue solution in concentrated sulfuric acid, and forms with caustic soda solution and hydrosulphite a bordeaux-red vat from which strong grey to black dyeings are obtained on the vegetable fibre.

Example 7

78 parts of tetrabromdibenzanthrone, prepared for example from dibenzanthrone by bromination in chlorsulfonic acid are boiled in 3000 parts of nitrobenzene with 46 parts of beta-aminoanthraquinone 94 parts of amino-dibenzanthrone (prepared for example as

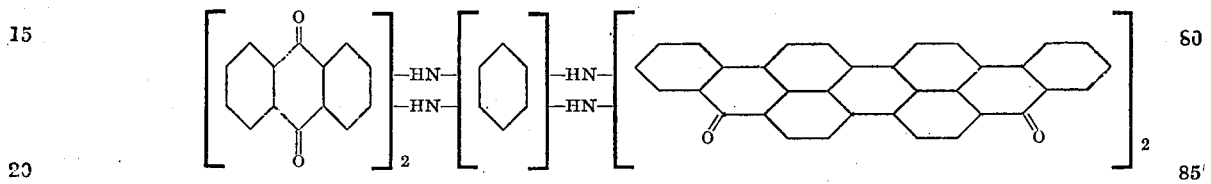

stated in Example 1) 100 parts of cupric oxid and 5 parts of copper acetate until the formation of the dyestuff ceases to increase, the further treatment being carried out in the usual manner. The dyestuff is obtained in the form of a blue black powder, which dissolves to a violet solution in concentrated sulfuric acid and gives extremely fast blue black dyeings on cotton from a blue hydrosulphite vat.

Example 8

36 parts of tetrabrompyranthrone, prepared, for example, as in Example 1, are boiled and stirred, in 1000 parts of nitrobenzene, with 82 parts of aminodibenzanthrone, prepared for instance according to U. S.

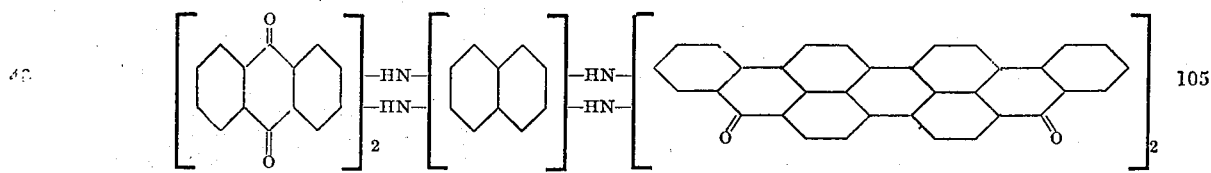

Patent No. 796,393, 6 parts of 1-aminoanthraquinone, 25 parts of sodium acetate, 5 parts of cupric oxid and 3 parts of copper carbonate, until the formation of the dyestuff is complete. After cooling, the product is filtered by suction, and is then treated as in Example 1, or the treatment of the reaction mixture may also consist in distilling off the nitrobenzene under diminished pressure or with steam. The dyestuff, which is obtained in an excellent yield and state of purity, is a black powder which dissolves to a violet solution in concentrated sulfuric acid, and gives strong grey to black, very fast dyeings on the vegetable fibre from a blue vat. A product dyeing a more brownish tinge, the other properties being equal, is obtained by causing to react at high temperature an intimate mixture of the above mentioned finely pulverized reaction components in the absence of any diluting medium.

Example 9

20 parts of tetrabrombenzene are boiled, while stirring, with 22.3 parts of 1-aminoanthraquinone, 47.1 parts of amino-dibenzanthrone. 7.6 parts of copper oxid and 75 parts of sodium acetate in 500 parts of nitrobenzene until the reaction product is practically free from bromine. The reaction mixture is then worked up as described in Example 1 and a dyestuff probably corresponding to the formula:

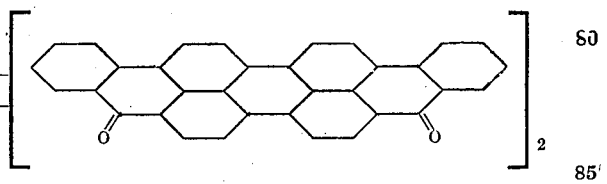

obtained in the form of a blue black powder dissolving to a violet solution in concentrated sulfuric acid and dyeing cotton from a blue vat green blue very fast shades.

Example 10

A suspension of 20 parts of tetrachlornaphthalene, prepared by introducing chlorine into molten naphthalene, 17.8 parts of 1-aminoanthraquinone, 37.7 parts of aminodibenzanthrone, 6 parts of copper oxid and 30 parts of sodium acetate in 500 parts of nitrobenzene are boiled until the formation of the dyestuff is complete. The reaction mixture is then worked up as described in Example 1 and a dyestuff corresponding to the formula:

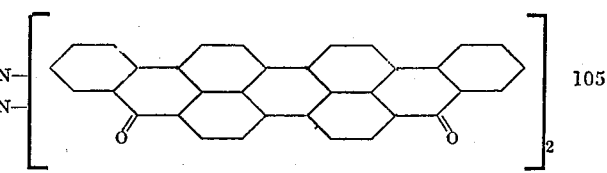

obtained dissolving to a violet solution in concentrated sulfuric acid and dyeing cotton from a blue vat green blue very fast shades.

Example 11

12.4 parts of 2.6-dichloranthracene are boiled, while stirring, with 11.2 parts of 1-aminoanthraquinone, 23.6 parts of aminodibenzanthrone, 4.5 parts of copper oxid and 20 parts of sodium acetate in 300 parts of nitrobenzene until the reaction product is practically free from chlorine. The dyestuff obtained by working up the reaction mixture in the usual way is a black powder dyeing cotton from a blue vat grey blue to black very fast shades.

Example 12

60 parts of dibromdibenzpyrenequinone (prepared by brominating dibenzyrenequinone in chlorsulfonic acid below 80° C. in the presence of iodine) are boiled, while stirring, in 2000 parts of nitrobenzene with 30 parts of 1-aminoanthraquinone, 55 parts of aminodibenzanthrone, 50 parts of sodium acetate and 15 parts of copper oxid until the formation of the dyestuff is complete. After cooling the reaction product is filtered by suction and worked up as usual. The solvent may however be removed as well by distillation with steam. The dyestuff thus obtained is a black powder dissolving to a violet solution in concentrated sulfuric acid and dyes cotton from a blue vat blue grey to blue black shades of remarkable fastness. If the dibrom derivative of perylene-quinone (prepared by brominating perylene-quinone in aqueous suspension) be employed instead of dibromdibenzpyrenequinone a dyestuff of similar tinctorial properties is obtained.

Example 13

27.8 parts of 1.5-dichloranthraquinone are boiled in 1000 parts of nitrobenzene with 25 parts of sodium acetate, 7 parts of copper oxid, 23 parts of 2-aminoanthraquinone and 47 parts of pure aminodibenzanthrone as obtained according to the German Patent No. 402.641 until the reaction product is practically free from halogen. The reaction product is then worked up as described in Example 8. The vat dyestuff, a black powder, which is obtained in a high yield, dissolves to a violet throne in chlorsulfonic acid with 1 molecular weight of bromine with the aid of sulfur as halogen transferrer), 25 parts of sodium acetate, 7 parts of copper oxid, 11.5 parts of 1-aminoanthraquinone, 23 parts of aminodibenzanthrone in 1000 parts of nitrobenzene is boiled, while stirring, until the reaction product is practically free from halogen. The dyestuff formed is recovered either by filtration or by distilling off the nitrobenzene, if desired under diminished pressure or by steam, and is a black powder dissolving to a violet solution in concentrated sulfuric acid and dyes cotton from a blue violet vat grey to black excellent fast shades.

Example 16

56 parts of dibrompyranthrone prepared by brominating pyranthrone in aqueous suspension with hypobromite are boiled in 1500 parts of nitrobenzene with 50 parts of sodium acetate, 20 parts of copper oxid, 23 parts of aminonthraquinone and 55 parts of 5-amino-4'-benzoyl-amino-8-methoxy-1.1'-anthrimidcarbazol (obtainable from 5.4'-dibenzoyldiamino-8-methoxy-1.1'-anthrimidcarbazol by partial saponification with sulfuric acid) until the reaction product is practically free from bromine. The reaction mixture is worked up as described in Example 15. The dyestuff probably corresponding to the formula:

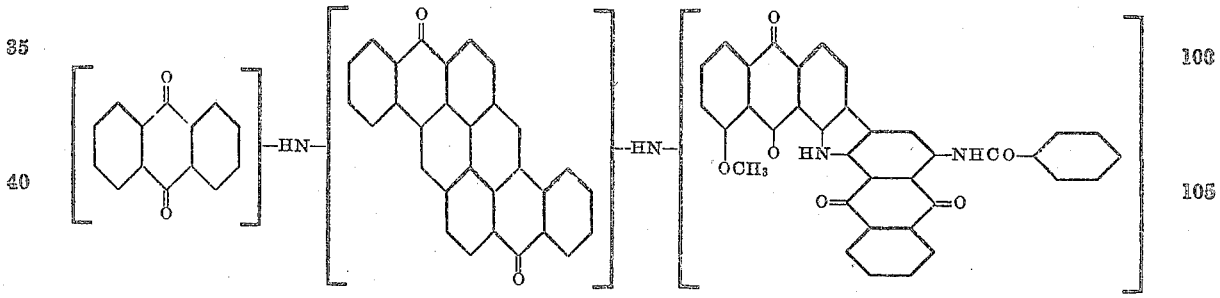

solution in concentrated sulfuric acid and dyes cotton blue grey to blue black shades of excellent fastness from a blue vat.

Example 14

30 parts of 1.5-dinitroanthraquinone are boiled in 1500 parts of nitrobenzene with 50 parts of sodium acetate, 10 parts of copper oxid, 23 parts of 1-aminoanthraquinone and 47 parts of aminodibenzanthrone until the formation of the dyestuff is complete. The reaction product is then worked up in the usual manner. The dyestuff thus obtained is a black powder dissolving to a violet solution in concentrated sulfuric acid and dyes cotton from a blue vat strong grey or black shades of very good fastness.

Example 15

A suspension of 28 parts of dibrompyranthrone (prepared by brominating pyranwhich is obtained in the form of a brown black powder dissolving to a violet solution in concentrated sulfuric acid dyes cotton from a red violet dark brown very fast shades.

Example 17

9.4 parts of dichlor-allo-ms-naphthodianthrone are boiled in 250 parts of nitrobenzene with 4.6 parts of 1-amino-anthraquinone, 5 parts of 6-aminobenzanthrone, 5 parts of sodium acetate and 2 parts of mercury oxid until the reaction product is practically free from chlorine. By working up the reaction mixture in the usual way the dyestuff is obtained as a violet black powder dissolving to a yellow green solution in concentrated sulfuric acid and dyeing cotton grey very fast shades from a brown violet vat.

Example 18

A suspension of 5.6 parts of dibrom-ms-anthradianthrone (obtainable by brominating the condensation product of allo-ms-naphthodianthrone), 4.7 parts of aminodibenzanthrone, 2.3 parts of 1-aminoanthraquinone, 5 parts of sodium acetate and 2 parts of copper oxid in 250 parts of nitrobenzene is boiled, while stirring, until the reaction product is practically free from bromine. By working up the reaction mixture in the usual way a black powder is obtained dissolving to a violet solution in concentrated sulfuric acid and furnishing black excellent fast shades on cotton from a violet vat.

Example 19

5 parts of dibromdibenzpyrenequinone are boiled, while stirring, in 200 parts of naphthalene with 5 parts of sodium acetate, 1 part of copper oxid, 2.3 parts of 1-aminoanthraquinone and 2.5 parts of 1.4-diaminoanthraquinone until the reaction product is practically free from bromine. By working up the reaction product in the usual way a violet black powder is obtained dissolving to a violet solution in concentrated sulfuric acid and furnishing very strong violet shades on cotton from an orange red vat.

Example 20

A suspension of 4.9 parts of dibromdibenzpyrenequinone, 2.5 parts of 1-amino-8-methoxyanthraquinone, 3.2 parts of 1-amino-4-benzoylaminoanthraquinone, 5 parts of sodium acetate and 1 part of copper oxid in 250 parts of naphthalene is boiled while stirring, until the reaction product is practically free from bromine. The reaction mixture is then worked up in the usual manner and a blue black powder obtained dissolving to a blue solution in concentrated sulfuric acid and dyeing cotton from an orange red vat dark blue to blue black shades of excellent fastness. The dyestuff probably corresponds to the formula:

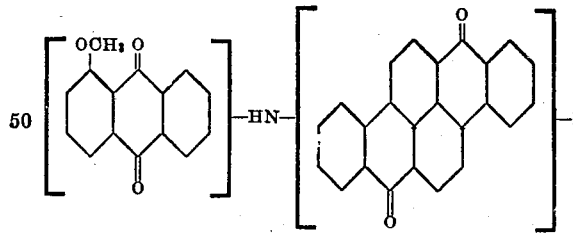

Example 21

A suspension of 5 parts of dibromdibenzpyrenequinone, 4.7 parts of aminodibenzanthrone, 3.2 parts of aminoanthanthrone (obtainable by reduction of mono-nitro-anthanthrone prepared by nitrating anthanthrone with highly concentrated nitric acid in nitrobenzene), 5 parts of sodium acetate and 1 part of copper oxid is boiled, while stirring, until the reaction product is practically free from bromine. By working up the reaction mixture in the usual way a black powder is obtained dissolving to a violet solution in concentrated sulfuric acid and dyeing the vegetable fibre from a violet vat greenish black very fast shades.

Example 22

4.9 parts of pure dibromdibenzpyrenequinone are boiled, while stirring, in 250 parts of nitrobenzene with 5 parts of sodium acetate, 2 parts of copper oxid, 2.3 parts of 1-aminoanthraquinone and 5 parts of 5 amino-4'-benzoylamino-1.1' anthrimidcarbazol (prepared from 5.4'-dibenzoyldiamino-1.1'-anthrimidcarbazol by partial saponification) until the reaction product is practically free from bromine. The dyestuff is recovered in the usual way and forms a violet black powder dissolving to a brown violet solution in concentrated sulfuric acid and dyes cotton from a brown red vat currant violet very fast shades.

Example 23

A suspension of 23 parts of dibromanthanthrone, 20 parts of sodium acetate, 7 parts of copper oxid, 11.5 parts of 1-aminoanthraquinone, 12 parts of 1.5-diaminoanthraquinone in 1000 parts of nitrobenzene is boiled, while stirring, until the reaction product is practically free from bromine. The dyestuff recovered in the usual way is a black powder dissolving to a yellow green solution in concentrated sulfuric acid and dyeing the vegetable fibre grey excellently fast shades from a brown red vat.

Example 24

11.5 parts of dibromanthanthrone are boiled, while stirring in 500 parts of nitrobenzene with 6 parts of 1.5-diaminoanthraquinone, 12 parts of aminodibenzanthrone,

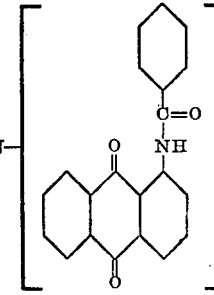

10 parts of sodium acetate and 4 parts of copper oxid until the reaction product is practically free from bromine. By working up the reaction mixture in the usual way the dyestuff is obtained in the form of a black powder dissolving to a violet solution in concentrated sulfuric acid and dyeing cotton from a blue vat green grey shades of very good fastness.

By treating the dyestuff with benzoylchlo-

Example 25

4.6 parts of dibromanthanthrone are boiled while stirring, in 250 parts of nitrobenzene with 2.3 parts of 1-aminoanthraquinone, 5.5 parts of 5-amino-4'-benzoylamino-8-methoxy-1.1'-anthrimidcarbazol, 5 parts of sodium acetate and 1.5 parts of copper oxid until the reaction product is practically free from bromine. By working up the reaction mixture in the usual way a brown black powder is obtained dyeing cotton from a brown red vat grey very fast shades. The dyestuff dissolves to a grey violet solution in concentrated sulfuric acid.

Example 26

A suspension of 4.6 parts of dibromanthanthrone, 3.2 parts of aminoanthanthrone, 4.2 parts of mono-amino-pyranthrone (prepared by reduction of the mono-nitropyranthrone obtainable by nitrating pyranthrone in nitrobenzene with highly concentrated nitric acid), 5 parts of sodium acetate and 2 parts of copper oxid and 250 parts of nitrobenzene is boiled, while stirring until the reaction product is practically free from bromine. The reaction mixture is then worked up in the usual manner and the dyestuff obtained in the form of a brown black powder dissolving to a green blue solution in concentrated sulfuric acid and dyeing cotton brown very strong shades from a red violet vat.

Example 27

8.8 parts of mono-chlor-mono-bromanthraquinonebenzacridon are boiled while stirring in 500 parts of nitrobenzene with 4.6 parts of 1-aminoanthraquinone, 9 parts of aminodibenzanthrone, 10 parts of sodium acetate and 3 parts of copper oxid until the reaction product is practically free from halogen. The dyestuff probably corresponding to the formula:

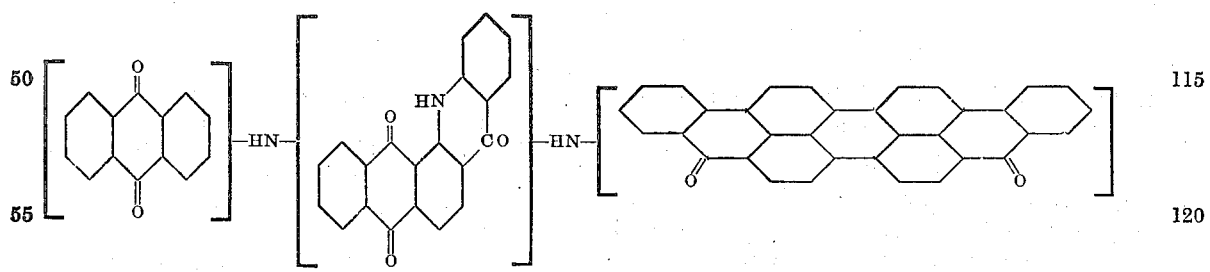

is recovered in the usual way and forms a black powder dissolving to a violet solution in concentrated sulfuric acid and dyeing cotton from a blue violet vat grey very fast shades.

Example 28

6.2 parts of dibromdibenzanthrone (obtainable by brominating dibenzanthrone in chlorsulfonic acid) are boiled, while stirring, in 250 parts of nitrobenzene with 5 parts of sodium acetate, 2 parts of copper oxide, 2.3 parts of 1-amino-anthraquinone and 4.7 parts of aminodibenzanthrone until the reaction product is practically free from bromine. By working up the reaction mixture in the usual manner the dyestuff is obtained in the form of a black powder dissolving to a violet solution in concentrated sulfuric acid and dyeing cotton from a blue vat green blue very fast shades.

Equally well naphthalene may be used as suspension medium instead of nitrobenzene.

Example 29

6.2 parts of dibrom-iso-dibenzanthrone (prepared by brominating iso-dibenzanthrone in chlorsulfonic acid) are boiled, while stirring, in 200 parts of nitrotoluene with 2.3 parts of 1-aminoanthraquinone, 4.7 parts of aminodibenzanthrone, 5 parts of sodium acetate and 1 part of copper oxid until the reaction product is practically free from bromine. By working up the reaction mixture in the usual way a dyestuff is obtained in the form of a black powder dissolving to a violet solution in concentrated sulfuric acid and furnishing on cotton from a green blue vat dark blue remarkable fast shades which in contradistinction to the dyeings obtained from the initial materials do not change when moistened with water.

Example 30

62 parts of dibromdibenzanthrone are boiled, while stirring, in 1000 parts of nitrobenzene with 50 parts of sodium acetate, 10 parts of copper oxid, 23 parts of 1-aminoanthraquinone and 25 parts of 1-aminoanthraquinone-2-aldehyde until the reaction product is practically free from bromine. The reaction mixture is then worked up in the usual way and a dyestuff obtained in the form of a black powder dissolving to a violet solution in concentrated sulfuric acid and dyeing cotton from a violet vat very strong grey shades.

The dyestuff obtained in an analogous manner from dibrom-iso-dibenzanthrone dissolves to a green solution in concentrated sulfuric acid and dyes cotton from a blue violet vat very fast violet shades.

Example 31

6.2 parts of dibrom-iso-dibenzanthrone are boiled, while stirring, in 250 parts of nitrobenzene with 3.2 parts of mono-aminoanthanthrone, 2.3 parts of 1-aminoanthraquinone, 5 parts of sodium acetate and 1 part of copper oxid until the reaction product is practically free from bromine. The dyestuff obtained by working up the reaction mixture in the usual way is a blue black powder dissolving to a yellow green solution in concentrated sulfuric acid and furnishes on cotton from a violet vat very fast dark blue shades.

The dyestuff obtained in an analogous manner from dibromdibenzanthrone dissolves to a violet solution in concentrated sulfuric acid and dyes cotton strong grey very fast shades.

Example 32

6.2 parts of dibromdibenzanthrone are boiled, while stirring, in 250 parts of nitrobenzene with 4.2 parts of aminopyranthrone (prepared as described in Example 26), 3.2 parts of 1-amino-5-benzoylaminoanthraquinone, 5 parts of sodium acetate and 2 parts of copper oxid until the reaction mixture is practically free from bromine. The black powder obtained by working up the reaction mixture in the usual way dissolves to a violet solution in concentrated sulfuric acid and dyes cotton from a red violet vat grey to black very fast shades.

The dyestuff obtained in an analogous manner from dibrom-iso-dibenzanthrone dissolves to a blue green solution in concentrated sulfuric acid and dyes cotton from a brown violet vat green to black very fast shades. The dyestuff obtained from dibrom-iso-dibenzanthrone in the aforesaid manner dyes cotton blue black shades.

Example 34

6.2 parts of dibrom-iso-dibenzanthrone are boiled while stirring in 250 parts of nitrobenzene with 2.3 parts of 1-aminoanthraquinone, 3.5 parts of mono-aminodibenzpyrenequinone (prepared by reduction of the mononitrodibenzpyrenequinone obtainable by nitrating dibenzpyrenequinone in nitrobenzene with highly concentrated nitric acid), 5 parts of sodium acetate and 2 parts of copper oxid until the reaction product is practically free from bromine. The dyestuff recovered in the usual way is a blue black powder dissolving to a blue green solution in concentrated sulfuric acid and dyes cotton from a blue violet vat dark blue excellent fast shades.

The dyestuff obtained in an analogous manner from dibromdibenzanthrone dissolves to a violet solution in concentrated sulfuric acid and dyes cotton from a violet vat strong blue black shades.

Example 35

5.1 parts of the dichlor derivative of the dyestuff obtainable by caustic alkali fusion and subsequent alkylation of pyrazolanthrone are boiled, while stirring, in 200 parts of nitrobenzene with 2.3 parts of 1-aminoanthraquinone, 4.7 parts of aminodibenzanthrone, 5 parts of sodium acetate and 2 parts of copper oxid until the reaction product is practically free from chlorine. The dyestuff recovered in the usual way probably corresponding to the formula:

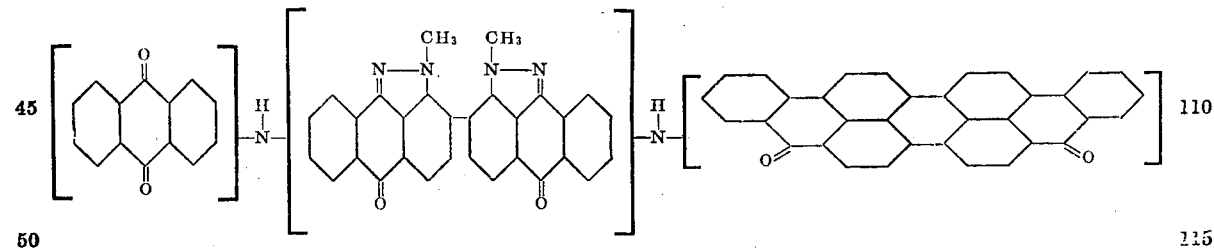

is a dark violet powder dissolving to a brown red solution in concentrated sulfuric acid and dyes cotton from a blue vat red violet very fast shades.

Example 33

6.2 parts dibromdibenzanthrone (obtainable as described in Example 28) are boiled in 250 parts of nitrobenzene with 6.7 parts of 5-amino-4'-benzoylamino-1.1'-anthrimidcarbazol, 2.3 parts of 1-aminoanthraquinone, 10 parts of sodium acetate and 1.3 parts of copper oxid until the reaction mixture is practically free from bromine. The reaction mixture is then worked up in the usual way and the dyestuff obtained in the form of a black powder dissolving to a violet solution

Example 36

5.7 parts of dibromflavanthrone (obtainable by brominating flavanthrone in chlorsulfonic acid) are boiled while stirring in 250 parts of nitrobenzene with 3.3 parts of 1 aminoanthraquinone, 4.7 parts of aminodibenzanthrone, 5 parts of sodium acetate and 1 part of copper oxid until the reaction product is practically free from bromine. By working up the reaction mixture in the usual way the dyestuff probably corresponding to the formula:

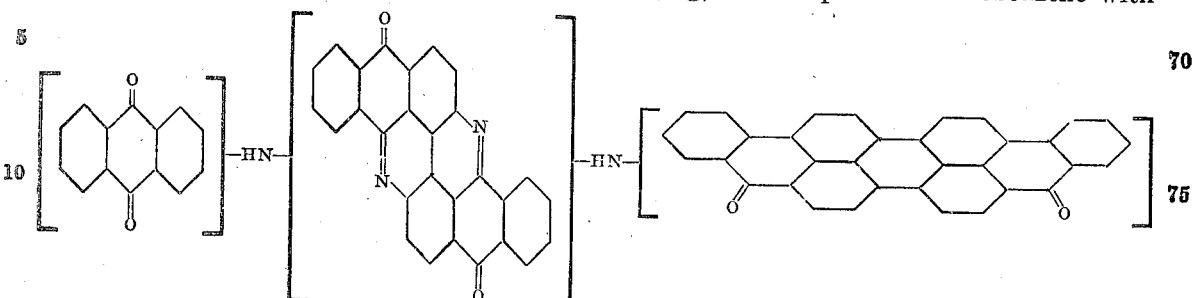

is obtained in the form of a green black powder dissolving to a violet solution in concentrated sulfuric acid and dyes cotton from a blue vat strong olive grey shades. The dyestuff obtained by condensation of 1-molecular weight of dibromflavanthrone with 1 molecular weight of cyclohexylamine and 1 molecular weight of aminodibenzanthrone in the aforesaid manner probably corresponding to the formula:

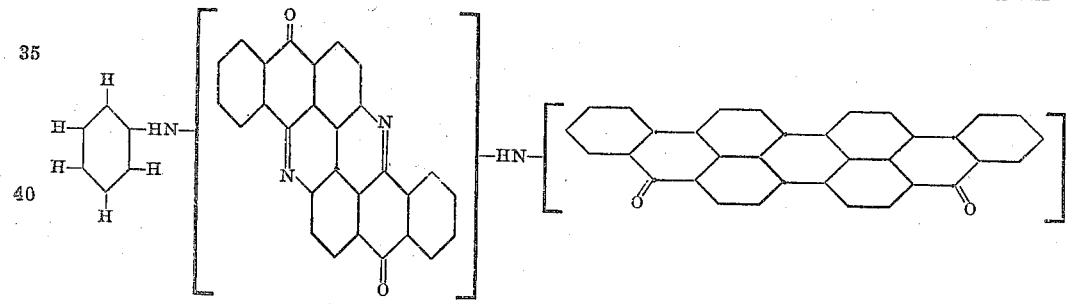

dissolves to a violet solution in concentrated sulfuric acid and dyes cotton from a blue vat strong olive shades.

Example 37

5.5 parts of dibrom-6.6'-dichlor-4.4'-dimethylthioindigo (obtainable by brominating 6.6'-dichlor-4.4'-dimethylthioindigo in nitrobenzene) are boiled for 15 hours, while stirring in 200 parts of nitrobenzene with 4.7 parts of amino dibenzanthrone, 2.3 parts of 1-aminoanthraquinone, 5 parts of sodium acetate and 2 parts of copper oxid whereupon the reaction mixture is worked up in the usual way. The dyestuff obtained is a black powder dissolving to a red brown solution in concentrated sulfuric acid and dyeing the vegetable fibre from a blue vat green grey to black excellent fast shades.

Example 38

18.4 parts of dibromphenanthrenequinone (obtainable by brominating phenathrenequinone in nitrobenzene) are boiled, while stirring, in 1000 parts of nitrobenzene with 11.5 parts of 1-aminoanthraquinone, 3 parts of aminodibenzanthrone, 20 parts of sodium acetate and 5 parts of copper oxid until the reaction product is practically free from bromine. The reaction mixture is then worked up in the usual way and at the dyestuff obtained probably corresponding to the formula:

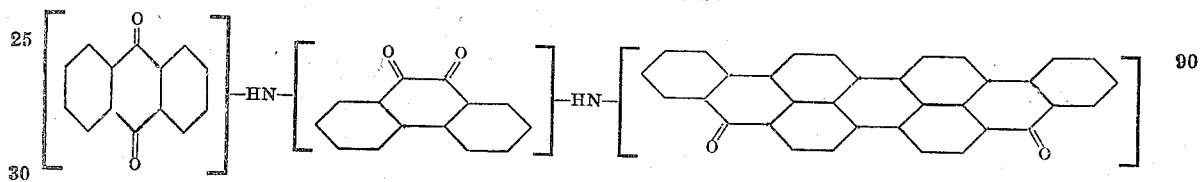

in the form of a black powder dissolving to a violet solution in concentrated sulfuric acid and dyes cotton very fast grey to black shades from a blue vat.

Example 39

6 parts of 3.3'-dibrom-N-dihydro-1.2.1.'2'-anthraquinoneazine are boiled, while stirring, in 250 parts of nitrobenzene with 10 parts of sodium acetate, 2 parts of copper oxid, 2.3 parts of 1-aminoanthraquinone and 6.7 parts of 5-amino-4'-benzoylamino-8-methoxy-1.1'-anthrimidcarbazol until the reaction product is practically free from bromine. The dyestuff recovered by working up the reaction mixture in the usual way is a brown black powder dissolving to a brown solution in concentrated sulfuric acid and furnishes strong dark brown shades on cotton from a brown vat.

Example 40

6.4 parts of tribrompyranthrone are boiled while stirring, in 250 parts of nitrobenzene with 2.3 parts of 1-amino-anthraquinone, 9.4 parts of aminodibenzanthrone, 5 parts of sodium acetate and 2 parts of copper oxid until the reaction product is practically free from bromine. The reaction mixture is then worked up in the usual way and an excellent yield of the dyestuff is obtained in the form of a black powder dissolving to a violet solution in concentrated sulfuric acid dyeing cotton grey to black shades of excellent fastness from a blue violet vat.

*Example 41*

A suspension of 64 parts of tribrompyranthrone, 50 parts of sodium acetate, 10 parts of copper oxid, 25 parts of 1.5-diaminoanthraquinone and 94 parts of aminodibenzanthrone in 1000 parts of nitrobenzene is boiled, while stirring, until the reaction product is practically free from bromine. The dyestuff obtained by working up the reaction mixture in the usual way is a black powder dissolving to a red violet solution in concentrated sulfuric acid and dyes the vegetable fibre grey to black shades of very good fastness from a blue vat.

If the equimolecular weight of 1-amino-8-methoxyanthraquinone or 1-amino-5-benzoylamino-8-methoxyanthraquinone is employed instead of 1.5-diaminoanthraquinone, dyestuffs of similar properties are obtained.

*Example 42*

4.3 parts of trichloranthraquinone benzacridon are boiled, while stirring, in 200 parts of nitrobenzene with 4.7 parts of aminodibenzanthrone, 4.6 parts of 1-aminoanthraquinone, 1.2 parts of 1.5-diaminoanthraquinone, 5 parts of sodium acetate and 2 parts of copper oxid until the reaction product is practically free from chlorine. The dyestuff obtained by working up the reaction mixture in the usual way is a black powder dissolving to a violet solution in concentrated sulfuric acid and dyes the vegetable fibre grey to black very fast shades from a blue vat.

*Example 43*

4.3 parts of trichloranthraquinone benzacridon are boiled, while stirring, in 100 parts of nitrobenzene with 2.3 parts of 1-aminoanthraquinone, 6.8 parts of 1-amino-5-benzoylamino-8-methoxyanthraquinone, 5 parts of sodium acetate and 2 parts of copper oxid until the formation of the dyestuff is complete. By working up the reaction mixture in the usual way the dyestuff probably corresponding to the formula:

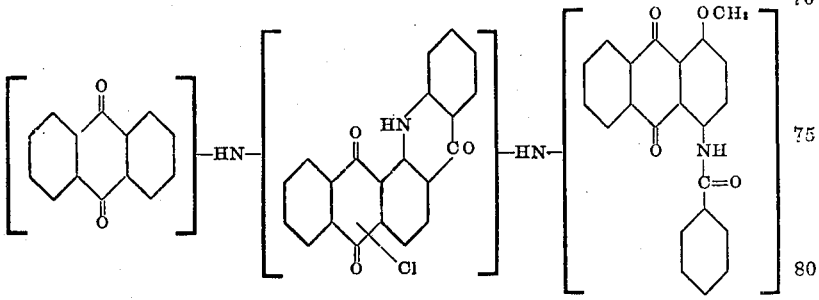

is obtained in the form of a violet black powder dissolving to an olive solution in concentrated sulfuric acid and dyeing cotton from a brown vat violet grey shades.

*Example 44*

5.6 parts of tribromanthraquinonenaphthacridon (prepared by brominating anthraquinonenaphthacridon in chlorosulfonic acid) are boiled, while stirring, in 200 parts of nitrobenzene with 5 parts of 1-amino-4-methoxyanthraquinone, 4.2 parts of mono-aminopyranthrone (prepared as described in Example 26), 5 parts of sodium acetate and 2 parts of copper oxid until the formation of the dyestuff is complete. The reaction mixture is then worked up in the usual way and the dyestuff obtained in the form of a black powder dissolving to a blue solution in concentrated sulfuric acid furnishing grey shades on cotton from a red violet vat.

*Example 45*

6.8 parts of tribrom-N-dihydro-1.2.1.'2'-anthraquinoneazine (obtainable by brominating N-dihydro-1.2.1.'2'-anthraquinoneazine in chlorsulfonic acid) are boiled in 200 parts of nitrobenzene with 2.3 parts of 1-aminoanthraquinone, 5 parts of 1-amino-4-methoxyanthraquinone, 5 parts of sodium acetate and 2 parts of copper acetate until the formation of the dyestuff is complete. The reaction mixture is then worked up in the usual way. The dyestuff thus obtained is a black powder dissolving to an olive solution in concentrated sulfuric acid dyeing cotton from a bright blue vat grey shades.

*Example 46*

68 parts of tribrom-N-dihydro-1.2.1.'2'-anthraquinoneazine are boiled, while stirring, in 1000 parts of nitrobenzene with 46 parts of 1-aminoanthraquinone, 47 parts of aminodibenzanthrone, 50 parts of sodium acetate and 10 parts of copper bronze until the reaction product is practically free from bromine. The dyestuff recovered in the usual way is a black powder dissolving to a violet solution in concentrated sufuric acid and dyes cotton from a bue green vat green grey to beack shades of very good fastness.

Exampe 47

7 parts of tribromdibenzanthrone (prepared by brominating dibenzanthrone in chlorsulfonic acid) are boiled, while stirring, in 200 parts of nitrobenzene with 4.6 parts of 1-aminoanthraquinone, 1.3 parts of 1.5-diaminoanthraquinone, 5 parts of sodium acetate and 2 parts of copper oxid until the reaction product is practically free from bromine. The dyestuff recovered in the usual way as a violet black powder dissolves to a brown solution in concentrated sulfuric acid and furnishes grey dyeings of excellent fastness on cotton from a green vat.

The dyestuff obtained in an analogous manner from tribrom-iso-dibenzanthrone dissolves to a yellow green solution in concentrated sulfuric acid and dyes cotton blue grey shades.

Example 48

A suspension of 7 parts of tribrom-iso-dibenzanthrone (obtainable by treating iso-dibenzanthrone in chlorsulfonic acid with the calculated amount of bromine in the presence of sulfur), 2.4 parts 6-aminobenzanthrone, 9.4 parts of aminodibenzanthrone, 5 parts of sodium acetate and 2 parts of copper oxid in 250 parts of nitrobenzene is boiled, while stirring, until the reaction product is practically free from bromine. The dyestuff obtained by working up the reaction mixture in the usual way is a dark blue powder dissolving to a violet solution in concentrated sulfuric acid and dyeing cotton from a blue vat dark blue excellent fast shades.

The dyestuff obtained in an analogous manner from tribromdibenzanthrone dissolves to a violet solution in concentrated sulfuric acid and dyes cotton green grey shades from a blue vat.

Example 49

7 parts of tribrom-iso-dibenzanthrone are boiled, while stirring, in 200 parts of nitrobenzene with 2.3 parts of 2-aminoanthraquinone, 8.4 parts of mono-aminopyranthrone (prepared as described in Example 26), 5 parts of sodium acetate and 2 parts of copper oxid until the reaction product is practically free from bromine. The reaction mixture is then worked up in the usual manner and the dyestuff obtained in the form of a black powder dissolving to a violet solution in concentrated sulfuric acid dyeing cotton from a violet vat strong grey shades.

The dyestuff obtained in an analogous manner from tribromdibenzanthrone exhibits similar tinctorial properties.

Example 50

7 parts of tribromdibenzanthrone are boiled, while stirring, in 250 parts of nitrobenzene with 2.3 parts of 1-amino-anthraquinone, 3.2 parts of mono-aminoanthanthrone, 6.7 parts of 5-amino-4'-benzoylamino-1.1'-anthrimidcarbazol, 10 parts of sodium acetate and 3 parts of copper oxid until the reaction product is practically free from bromine. The dyestuff recovered in the usual way is a black powder, dissolves to a brown solution in concentrated sulfuric acid and dyes the vegetable fibre from a brown vat black shades of excellent fastness.

The dyestuff obtained in an analogous manner from tribrom-iso-dibenzanthrone is a black powder dissolving to a yellow green solution in concentrated sulfuric acid and dyes cotton grey to black shades from a violet brown vat.

Example 51

7 parts of tribromdibenzanthrone are boiled in 200 parts of nitrobenzene with 9.7 parts of aminodibenzanthrone, 2.3 parts of 1-aminoanthraquinone, 5 parts of sodium acetate and 2 parts of copper oxid until no unchanged initial material can any more be detected. The reaction mixture is then worked up in the usual way and the dyestuff not containing halogen is obtained in the form of a black powder dissolving to a violet solution in concentrated sulfuric acid and dyes cotton green grey very fast shades from a blue vat.

The dyestuff obtained in an analogous manner from tribrom-iso-dibenzanthrone dissolves to a violet solution in concentrated sulfuric acid and dyes cotton strong grey blue shades from a blue vat.

Example 52

36 parts of tetrabrompyranthrone (prepared as described in Example 1) are boiled, while stirring, in 1000 parts of nitrobenzene with 22.2 parts of 1-aminoanthraquinone, 22.2 parts of 2-aminoanthraquinone and 30 parts of anhydrous sodium acetate, 4 parts of copper oxid and 4 parts of copper carbonate until the reaction product is practically free from bromine. The reaction mixture is then worked up in the usual way and the dyestuff obtained in the form of a black powder dissolving to a violet solution in concentrated sulfuric acid and dyeing cotton violet grey shades from a brown violet vat.

Example 53

36 parts of tetrabrompyranthrone are boiled, while stirring, in 1000 parts of nitrobenzene with 47 parts of amino-dibenzanthrone, 27.7 parts of 1-aminoanthraquinone, 30 parts of sodium acetate and 7 parts of copper oxid until the reaction product is practically free from bromine. The dyestuff recovered in the usual way is a black powder dissolving to a red violet solution in concentrated sulfuric acid and dyes cotton from a reddish blue vat grey to black remarkably fast shades.

Example 54

36 parts of tetrabrompyranthrone are boiled, while stirring in 1000 parts of nitrobenzene with 23.5 parts of aminodibenzanthrone, 27.7 parts of 1-aminoanthraquinone, 22.2 parts of 2-aminoanthraquinone, 30 parts of sodium acetate, 4 parts of copper oxid and 4 parts of copper carbonate until the reaction product is practically free from bromine. The dyestuff obtained by working up the reaction mixture in the usual way is a black powder dissolving to a violet solution in concentrated sulfuric acid and dyes cotton from a blue vat grey to black very fast shades.

Example 55

7.2 parts of tetrabrompyranthrone are boiled, while stirring, in 250 parts of nitrobenzene with 10 parts of sodium acetate, 2 parts of copper oxid, 2.4 parts of 6-aminobenzanthrone, 6.9 parts of 1-aminoanthraquinone until the reaction product is practically free from bromine. The dyestuff obtained by working up the reaction mixture in the usual way is a black powder dissolving to a violet solution in concentrated sulfuric acid and furnishes violet grey excellently fast shades on cotton from a violet vat.

By alkali fusion a new dyestuff is obtained dyeing cotton black shades from a blue vat.

Example 56

14.4 parts of tetrabrompyranthrone are boiled, while stirring, in 500 parts of nitrobenzene with 33 parts of aminodibenzanthrone, 3.2 parts of aminoanthanthrone (prepared as described in Example 21), 12 parts of sodium acetate and 5 parts of copper oxid until the reaction product is practically free from bromine. The reaction mixture is then worked up in the usual manner and a dyestuff obtained in the form of a black powder dissolving to a violet solution in concentrated sulfuric acid and furnishes grey to black shades of excellent fastness on cotton from a blue vat.

When employing mono-aminopyranthrone instead of aminoanthanthrone a dyestuff is produced dissolving to a blue solution in concentrated sulfuric acid and dyeing cotton grey shades from a violet vat.

Example 57

7.8 parts of tetrabromdibenzanthrone (prepared by brominating dibenzanthrone in chlorsulfonic acid) are boiled, while stirring, in 250 parts of nitrobenzene with 10 parts of sodium acetate, 2 parts of copper oxid, 6.9 parts of 1-aminoanthraquinone and 2.3 parts of 2-aminoanthraquinone until the reaction product is practically free from bromine. The dyestuff recovered in the usual way is a black powder dissolving to a violet solution in concentrated sulfuric acid and dyes cotton from a violet brown vat grey very fast shades.

The dyestuff produced from tetrabromiso-dibenzanthrone in an analogous manner exhibits similar tinctorial properties.

Example 58

A suspension of 7.8 parts of tetrabrom-iso-dibenzanthrone (prepared by brominating iso-dibenzanthrone in chlorsulfonic acid), 10 parts of sodium acetate, 2 parts of copper oxid, 9.4 parts of aminodibenzanthrone and 4.6 parts of 1-aminoanthraquinone in 250 parts of nitrobenzene is boiled, while stirring until the reaction product is practically free from bromine. The dyestuff obtained by working up the reaction mixture in the usual way is a blue black powder dissolving to a violet solution in concentrated sulfuric acid and dyes the vegetable fibre from a blue vat blue grey very fast shades.

The dyestuff produced from tetrabromdibenzanthrone in an analogous manner dissolves to a violet solution in concentrated sulfuric acid and dyes cotton from a blue vat green grey shades.

Example 59

7.8 parts of tetrabrom-iso-dibenzanthrone are boiled, while stirring, in 250 parts of nitrobenzene with 14 parts of 5-amino-4'-benzoylamino-1.1'-anthrimidcarbazol, 4.6 parts of 1-aminoanthraquinone, 10 parts of sodium acetate and 2 parts of copper oxid until the reaction product is practically free from bromine. The reaction mixture is then worked up in the usual way and a black powder obtained dissolving to a brown solution in concentrated sulfuric acid and dyeing cotton from a brown vat grey to black shades of very good fastness.

Example 60

7.8 parts of tetrabromdibenzanthrone are boiled, while stirring, in 250 parts of nitrobenzene with 10 parts of sodium acetate, 2 parts of copper oxid, 1 part of aniline, 1 part of paratoluidine and 9.4 parts of aminodizenzanthrone until the reaction product is practically free from bromine. By working up the reaction mixture in the usual way an excellent yield of the dyestuff is obtained in the form of a black powder dissolving to a violet solution in concentrated sulfuric acid and dyeing cotton from a blue vat green grey very fast shades.

The dyestuff obtained from tetrabrom-iso-dibenzanthrone in an analogous manner dissolves in concentrated sulphuric acid to a violet solution and dyes cotton from a blue vat blue grey very fast shades.

*Example 61*

2.25 parts of tetrachloranthanthrone (obtainable by chlorinating anthanthrone in chlorsulfonic acid with the aid of iodine as halogen transferrer) are boiled, while stirring in 250 parts of nitrobenzene with 5 parts of sodium acetate, 2 parts of copper oxide, 2.3 parts of 1-aminoanthraquinone and 3.7 parts of 1-amino-5-benzoylamino-8-methoxy-anthraquinone until the reaction product is practically free from chlorine. The dyestuff obtained by working up the reaction mixture in the usual way is a black powder dissolving to a green brown solution in concentrated sulfuric acid and dyeing cotton brown shades of very good fastness from a red brown vat.

*Example 62*

4.5 parts of tetrachloranthanthrone are boiled while stirring, in 250 parts of nitrobenzene with 5 parts of sodium acetate, 2 parts of copper oxid, 6.7 parts of 5-amino-4'-benzoylamino-1.1'-anthrimidcarbazol and 4.6 parts of 1-aminoanthraquinone until the formation of the dyestuff is complete. The dyestuff recovered in the usual way is a dark brown powder dissolving to a brown solution in concentrated sulfuric acid and dyeing cotton very fast brown shades from a red brown vat.

*Example 63*

7 parts of tetrabrom-ms-benzdianthrone are boiled while stirring, in 150 parts of nitrobenzene with 5 parts of sodium acetate, 2 parts of aluminium, 6.9 parts of 1-aminoanthraquinone and 4.7 parts of aminodibenzanthrone until the reaction product is practically free from bromine. The dyestuff recovered in the usual way is a violet powder dissolving to a red violet solution in concentrated sulfuric acid and dyeing cotton violet blue shades of very good fastness from a blue vat.

*Example 64*

A suspension of 47 parts of tetrachlordibenzpyrenequinone (prepared by chlorinating dibenzpyrenequinone in chlorsulfonic acid), 50 parts of sodium acetate, 10 parts of copper oxid, 94 parts of aminodibenzanthrone and 46 parts of 1-aminoanthraquinone in 1000 parts of nitrobenzene is boiled while stirring, until the reaction product is practically free from halogen. The dyestuff obtained by working up the reaction mixture in the usual way is a black powder dissolving to a violet solution in concentrated sulfuric acid and dyeing cotton excellent fast green grey to black shades from a blue vat.

*Example 65*

7.8 parts of pentabrompyranthrone (obtainable by brominating pyranthrone in chlorsulfonic acid with an excess of bromine and employing iodine as halogen transferrer) are boiled, while stirring, in 150 parts of nitrobenzene with 10 parts of sodium acetate, 2 parts of copper oxid, 2.3 parts of 1-aminoanthraquinone and 19 parts of aminodibenzanthrone until the reaction product is practically free from bromine. The dyestuff obtained by working up the reaction mixture in the usual way is a black powder dissolving to a red violet solution in concentrated sulfuric acid and dyes cotton from a blue vat grey to black shades of excellent fastness.

*Example 66*

7.9 parts of hexabrom-8.8'-dihydroxynaphthazine (prepared by brominating 8.8'-dihydroxynaphthazine) are boiled, while stirring, in 250 parts of nitrobenzene with 10 parts of sodium acetate 2 parts of copper oxid, 18 parts of aminodibenzanthrone and 4.6 parts of aminoanthraquinone until the reaction product is practically free from halogen. The reaction mixture is worked up in the usual way and a dyestuff obtained in the form of a black powder dissolving to a violet solution in concentrated sulfuric acid and dyeing cotton from a blue vat green grey very excellent fast shades.

*Example 67*

8.3 parts of pentabrom-mono-chlorpyranthrone (obtainable by brominating pyranthrone in the way described in Example 65 under stronger conditions) are boiled, while stirring, in 250 parts of nitrobenzene with 10 parts of sodium acetate, 3 parts of copper oxid, 4.7 parts of aminodibenzanthrone and 4.6 parts of 1-aminoanthraquinone until the formation of the dyestuff is complete. The dyestuff obtained by working up the reaction mixture in the usual way is a black powder dissolving to a violet solution in concentrated sulfuric acid and dyes cotton from a blue vat strong grey to black shades of very good fastness.

*Example 68*

27 parts of hexachlordibenzpyrenequinone (obtainable by introducing chlorine into a solution of dibenzpyrenequinone in chlorsulfonic acid with the addition of iodine as halogen transferrer) are boiled, while stirring, in 1000 parts of nitrobenzene with 50 parts of sodium acetate, 10 parts of copper oxid, 47 parts of aminodibenzanthrone and 46 parts of 1-aminoanthraquinone until the reaction product is practically free from chlorine.

The dyestuff probably corresponding to the formula:

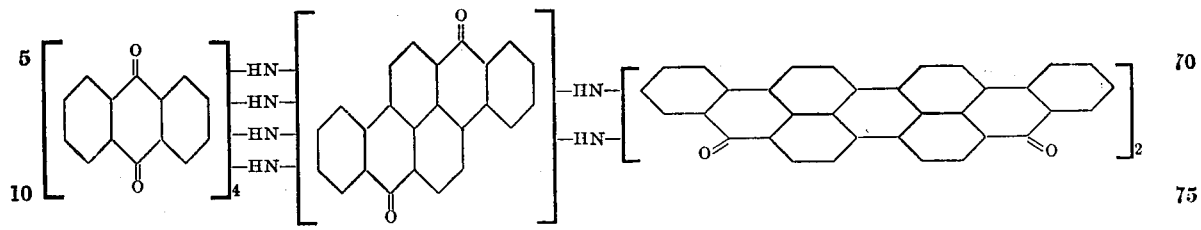

and dyeing cotton from a blue vat excellently fast green grey to black shades.

recovered by working up the reaction mixture in the usual way is a black powder dissolving to a violet solution in concentrated sulfuric acid and dyes cotton from a blue violet vat strong green grey shades.

*Example 69*

8.5 parts of tetrabromdichlor-iso-dibenzanthrone (prepared by brominating iso-dibenzanthrone in chlorsulfonic acid in the presence of sulfur at elevated temperature) are boiled, while stirring, in 250 parts of nitrobenzene with 10 parts of sodium acetate, 2 parts of copper oxid, 4.7 parts of aminodibenzanthrone and 4.6 parts of 1-aminoanthraquinone until the formation of the dyestuff is complete. The dyestuff recovered in the usual way is a blue black powder dissolving to a violet solution in concentrated sulfuric acid and dyes cotton from a blue vat blue grey excellently fast shades. The dyestuff obtained from tetrabromdichlordibenzanthrone in an analogous manner exhibits similar tinctorial properties.

*Example 70*

8.5 parts of tetrabromdichlordibenzanthrone are boiled, while stirring, in 250 parts of nitrobenzene with 10 parts of sodium acetate, 2 parts of copper oxid, 3.2 parts of monoaminoanthranthrone and 4.2 parts of monoaminopyranthrone until the formation of the dyestuff is complete. The reaction mixture is then worked up in the usual way and the dyestuff obtained in the form of a black powder dissolving to a violet solution in concentrated sulfuric acid and furnishes grey to black shades of excellent fastness on cotton from a violet vat.

*Example 71*

30 parts of octochlor-8.8'-dihydroxynaphthazin (prepared by chlorinating 8.8'-dihydroxynaphthazin) are boiled while stirring, in 1250 parts of nitrobenzene with 30 parts of sodium acetate, 10 parts of copper oxid, 46 parts of 1-aminoanthraquinone and 94 parts of aminodibenzanthrone until the reaction product is practically free from halogen. The reaction mixture is then worked up in the usual way and the dyestuff obtained in the form of a black powder dissolving to a violet solution in concentrated sulfuric acid

*Example 72*

4.7 parts of dichlor-allo-ms-naphthodianthrone are boiled, while stirring, in 100 parts of nitrobenzene with 5 parts of sodium acetate, 1 part of copper oxid, 1.2 parts of benzamide and 1.6 parts of m-methoxybenzamide until the reaction product is practically free from chlorine. The dyestuff obtained by working up the reaction mixture in the usual manner is a brown red powder dissolving in concentrated sulfuric acid to a green solution and dyeing cotton from a violet vat red shades.

If the equivalent amount of anthraquinone carboxylic acid amide be employed instead of benzamide a dyestuff dyeing cotton brown red shades is obtained.

*Example 73*

A suspension of 72 parts of tetrabrompyranthrone, 50 parts of sodium acetate, 15 parts of copper oxid, 46 parts of 1-aminoanthraquinone and 126 parts of dibrom-monoamino-dibenzanthrone (prepared by brominating aminodibenzanthrone in nitrobenzene) in 2000 parts of nitrobenzene is boiled, while stirring, until the formation of the dyestuff is complete. The dyestuff recovered in the usual manner is a black powder dissolving in concentrated sulfuric acid to a violet solution and dyeing cotton from a reddish blue vat grey to black shades of excellent fastness.

*Example 74*

49 parts of dibromdibenzpyrenequinone are boiled, while stirring, in 1000 parts of nitrobenzene with 50 parts of sodium acetate, 10 parts of copper carbonate, 63 parts of dibrommono-aminodibenzanthrone and 23 parts of 1-aminoanthraquinone until the formation of dyestuff does not anymore increase. The dyestuff obtained by working up the reaction mixture in the usual manner is a black powder dissolving in concentrated sulfuric acid to a violet solution and dyeing the vegetable fibre grey to black shades of very good fastness from a violet vat.

*Example 75*

7.2 parts of tetrabrompyranthrone, 9 parts of amino-iso-dibenzanthrone (prepared by nitrating pure isodibenzanthrone in nitrobenzene by means of nitric acid and reducing the nitrocompound thus obtained), 4.6 parts of 1-aminoanthraquinone, 10 parts of sodium acetate, 2 parts of copper oxid, are boiled, while stirring, in 200 parts of nitrobenzene until the reaction product is practically free from bromine. The dyestuff recovered as usual is a blue black powder dissolving in concentrated sulfuric acid to a green blue solution and dyeing cotton from a blue vat blue black very fast shades.

What we claim is:—

1. A process for the production of new vat dyestuffs which comprises condensing an aromatic compound containing a plurality of negative substituents with a plurality of nitrogenous aromatic compounds each containing at least one reactive hydrogen atom attached to a nitrogen atom of which at least two of said nitrogenous aromatic compounds are different from each other, at least one of the components being capable of being vatted.

2. A process for the production of new vat dyestuffs which comprises condensing an aromatic compound containing a plurality of negative substituents with a plurality of nitrogenous aromatic compounds each containing at least one reactive hydrogen atom attached to a nitrogen atom of which at least two of said nitrogenous aromatic compounds are different from each other at least one of the components being capable of being vatted, in the presence of a diluting medium.

3. A process for the production of new vat dyestuffs which comprises condensing an aromatic compound containing a plurality of negative substituents with a plurality of nitrogenous aromatic compounds each containing at least one reactive hydrogen atom attached to a nitrogen atom of which at least two of said nitrogenous aromatic compounds are different from each other, at least one of the components being capable of being vatted, in the presence of a diluting medium and a condensing catalyst.

4. A process for the production of new vat dyestuffs which comprises condensing an aromatic compound containing a plurality of negative substituents with a plurality of nitrogenous aromatic compounds each containing at least one reactive hydrogen atom attached to a nitrogen atom of which at least two of said nitrogenous aromatic compounds are different from each other, at least one of the components being capable of being vatted, in the presence of a diluting medium a condensing catalyst and an acid fixing agent.

5. A process for the production of new vat dyestuffs which comprises condensing an aromatic compound containing a plurality of negative substituents simultaneously with a plurality of nitrogenous aromatic compounds each containing at least one reactive hydrogen atom attached to a nitrogen atom of which at least two of said nitrogenous aromatic compounds are different from each other, at least one of the components being capable of being vatted.

6. As new articles of manufacture nitrogenous vat dyestuffs in which an aromatic radical is connected to at least two different aromatic radicals by nitrogen linkages, at least one of the aromatic radicals being capable of being vatted.

7. As new articles of manufacture nitrogenous vat dyestuffs in which an aromatic radical is connected to at least two different aromatic radicals by nitrogen linkages, three of the aromatic radicals being capable of being vatted.

8. As new articles of manufacture nitrogenous vat dyestuffs in which an aromatic radical is connected to at least two different aromatic radicals by nitrogen linkages all of the aromatic radicals being capable of being vatted.

9. As new articles of manufacture nitrogenous vat dyestuffs in which an aromatic radical is connected to at least two different aromatic radicals by nitrogen linkages, at least one of the aromatic radicals containing an anthrone radical and at least another radical is capable of being vatted.

10. As new articles of manufacture nitrogenous vat dyestuffs in which an aromatic radical is connected to at least two different aromatic radicals by nitrogen linkages, at least one of the aromatic radicals being a dianthrone radical formed from two anthrone radicals by connection with from 1 to 3 ring systems.

11. As new articles of manufacture nitrogenous vat dyestuffs in which an aromatic radical is connected to at least two different aromatic radicals by nitrogen linkages, at least one of the aromatic radicals being a dianthrone radical formed by two anthrone radicals by connection with two ring systems.

12. As new articles of manufacture nitrogenous vat dyestuffs in which an aromatic radical is connected to at least two different aromatic radicals by nitrogen linkages, at least one of the aromatic radicals being a pyranthrone radical.

13. As new articles of manufacture nitrogenous vat dyestuffs in which an aromatic radical is connected to different aromatic radicals by nitrogen linkages, two of the aromatic radicals containing anthrone radicals a third an anthraquinone radical.

14. As new articles of manufacture nitrogenous vat dyestuffs in which an aromatic radical is connected to different aromatic radicals by nitrogen linkages, two of the aromatic radicals being dianthrone radicals formed from two anthrone radicals by connection, with from 1 to 3 ring systems, a third being an anthraquinone radical.

15. As new articles of manufacture nitrogenous vat dyestuffs in which an aromatic radical is connected to different aromatic radicals by nitrogen linkages, one of the aromatic radicals being a dianthrone radical formed from two anthrone radicals by connection with from 1 to 3 ring systems a second a pyranthrone radical and a third an anthraquinone radical.

16. As new articles of manufacture nitrogenous vat dyestuffs in which an aromatic radical is connected to different aromatic radicals by nitrogen linkages, one of the aromatic radicals being a pyranthrone radical, a second a dibenzanthrone radical, a third an anthraquinone radical.

17. As new articles of manufacture nitrogenous vat dyestuffs in which an aromatic radical is connected to different aromatic radicals by nitrogen linkages, one of the aromatic radicals being a pyranthrone radical, a second and a third dibenzanthrone radicals, a fourth an anthraquinone radical.

18. As new article of manufacture the nitrogenous vat dyestuff which is a black powder dissolves to a violet solution in concentrated sulfuric acid dyes cotton from a blue vat black shades and in which a pyranthrone radical is connected by nitrogen linkages to two dibenzanthrone radicals and two anthraquinone radicals.

19. As new articles of manufacture nitrogenous vat dyestuffs in which an aromatic radical is connected to at least two different aromatic radicals by nitrogen linkages, at least two of the aromatic radicals being capable of being vatted.

20. As new articles of manufacture nitrogenous vat dyestuffs in which an aromatic radical is connected to at least two different aromatic radicals by nitrogen linkages, at least two of the said aromatic radicals attached by nitrogen linkages being capable of being vatted.

21. A process for the production of new vat dyestuffs which comprises condensing an aromatic compound containing a plurality of negative substituents with a plurality of aromatic amino compounds each containing at least one reactive hydrogen atom in an amino group, of which amino compounds at least two are different from each other, at least one of the components being capable of being vatted.

22. A process for the production of new vat dyestuffs which comprises condensing a polynuclear heterocyclic compound containing a plurality of negative constituents with a plurality of aromatic amino compounds each containing at least one reactive hydrogen atom in an amino group, of which amino compounds at least two are different from each other, at least one of the components being capable of being vatted.

23. As new articles of manufacture nitrogenous vat dyestuffs in which an aromatic radical is connected to at least two different aromatic radicals by amino groups at least one of the aromatic redicals being capable of being vatted.

24. As new articles of manufacture nitrogenous vat dyestuffs in which an aromatic radical is connected to at least two different aromatic radicals by amino groups, all of the aromatic radicals being capable of being vatted.

25. As new articles of manufacture nitrogenous vat dyestuffs in which an aromatic radical is connected to at least two different aromatic radicals by amino groups, at least one of the aromatic radicals being a dianthrone radical formed from two anthrone radicals by connection with from 1 to 3 ring systems.

26. As new articles of manufacture nitrogenous vat dyestuffs in which an aromatic radical is connected to at least two different aromatic radicals by amino groups, two of the aromatic radicals being dianthrone radicals formed from two anthrone radicals by connection with from one to three ring systems, and a third aromatic radical being an anthraquinone radical.

27. As new articles of manufacture nitrogenous vat dyestuffs in which a polynuclear heterocyclic radical is connected to at least two different aromatic radicals by amino groups, at least one of said radicals being capable of being vatted.

28. As new articles of manufacture nitrogenous vat dyestuffs in which a polynuclear heterocyclic radical is connected to at least two different aromatic radicals by amino groups, at least one of said radicals containing an anthrone radical and at least one other of said radicals being capable of being vatted.

29. As new articles of manufacture nitrogenous vat dyestuffs in which a polynuclear heterocyclic radical is connected to at least two different aromatic radicals by amino groups, said aromatic radicals being dianthrone radicals formed from two anthrone radicals by connection with from 1 to 3 ring systems.

In testimony whereof we have hereunto set our hands.

MAX ALBERT KUNZ.
KARL KOEBERLE.